United States Patent [19]

Sugamo et al.

[11] Patent Number: 5,243,031
[45] Date of Patent: Sep. 7, 1993

[54] PROCESS FOR THE PRODUCTION OF MONOAZO LAKE PIGMENT COATED WITH WATER-INSOLUBLE ROSIN AND IMPROVED IN LIPOPHILIC NATURE AND WATER RESISTANCE

[75] Inventors: Hitoshi Sugamo; Nobuyuki Tomiya; Yusuke Watabe, all of Tokyo, Japan

[73] Assignee: Toyo Ink Manufacturing Co., Ltd., Tokyo, Japan

[21] Appl. No.: 817,461

[22] Filed: Jan. 6, 1992

Related U.S. Application Data

[63] Continuation-in-part of Ser. No. 564,312, Aug. 8, 1990, Pat. No. 5,144,014.

[51] Int. Cl.$^5$ .................. C09B 63/00; C09D 11/00
[52] U.S. Cl. .................... 534/573; 534/581; 534/602; 534/739; 534/874; 534/882; 106/23 K; 106/496
[58] Field of Search ............... 534/573 L, 602, 874, 534/581, 739, 882

[56] References Cited

U.S. PATENT DOCUMENTS

| | | | |
|---|---|---|---|
| 2,350,522 | 6/1944 | O'Neal | 534/882 X |
| 3,036,059 | 5/1962 | Ehrhardt et al. | 534/739 X |
| 4,143,036 | 3/1979 | Stefancsik | 534/874 |

FOREIGN PATENT DOCUMENTS

| | | | |
|---|---|---|---|
| 63-120764 | 5/1988 | Japan . | |
| 703845 | 2/1954 | United Kingdom | 534/573 |

OTHER PUBLICATIONS

Sugamo, Hitoshi, English translation of JP63-120764 (1988).

Primary Examiner—Mary C. Lee
Assistant Examiner—Fiona T. Powers
Attorney, Agent, or Firm—Wenderoth, Lind & Ponack

[57] ABSTRACT

A process for the production of a monoazo lake coated with a water-insoluble metal salt of rosin, which comprises the steps of:

(a) adjusting a mixed solution containing a monoazo dye having a water-soluble group and an alkali metal or ammonium salt of rosin to pH of 8 to 12, and adding an stoichiometeric amount of a metal salt of at least one metal for insolubilizing rosin selected from the group consisting of zinc, aluminum, copper and manganese to form a water-insoluble rosin metal salt, and (b) adjusting the resultant mixture containing the water-insoluble rosin metal salt to pH of 9 to 12 and adding a metal salt of at least one metal for forming a lake of a monoazo dye selected from the group consisting of calcium, barium and strontium to form a monoazo lake.

6 Claims, No Drawings

PROCESS FOR THE PRODUCTION OF MONOAZO LAKE PIGMENT COATED WITH WATER-INSOLUBLE ROSIN AND IMPROVED IN LIPOPHILIC NATURE AND WATER RESISTANCE

This application is a continuation-in-part of application, Ser. No. 07/564,312 filed Aug. 8, 1990 now U.S. Pat. No. 5,144,014.

FIELD OF THE INVENTION

This invention relates to a process for the production of a monoazo lake useful as a pigment for use in various products such as a printing ink and a coating composition in particular, and a process for the production of a dispersion of the monoazo lake. More specifically, it relates to a process for the production of a monoazo lake which has improved lipophilic nature and therefore has improved water resistance, and a process for the production of a dispersion of the monoazo lake.

PRIOR ART

A monoazo lake, which is produced by coupling an aromatic amine having a soluble group as a diazo component with $\beta$-hydroxynaphthoic acid, $\beta$-naphthol, or the like as a coupler component and forming a lake of the resultant monoazo dye, has conventionally found its use in various fields of printing inks, coating compositions and coloring plastic products. The monoazo lake has been treated with rosin to obtain a transparent and clear color tone and improve dispersibility. The rosin-treatment is usually carried out as follows. A solution of an alkali metal salt of rosin (rosined soap) is added to the coupler component or dye, and a lake-forming metal salt, e.g., calcium chloride, is then added to precipitate an insoluble metal salt of the rosin on a lake surface.

A rosin-treated monoazo lake produced as above has improved clearness and dispersibility. When such a lake is used in a lithographic ink for offset printing (to be referred to as "offset ink" hereinafter), however, the rosin-treatment is considered to be one of the causes for a decrease in printability, water resistance-related troubles in particular.

U.S. Pat. No. 2,350,522 discloses a method for producing a monoazo pigment coated with a zinc salt of rosin. However, it does not describe any specific method for coating a lake of a dye formed with calcium, etc., with a rosin metal salt of which the metal is different from the metal used for forming the lake.

JP-A-63-120764 discloses a monoazo lake pigment formed by coupling a diazo component, which has been prepared by diazotizing an aromatic amine having a soluble group, and a coupler component selected from oxynaphthoic acids in the presence of a water-soluble salt of rosin, and forming a lake pigment with calcium metal, etc., during or after the coupling, in which the monoazo lake pigment is improved in water resistance by adding a salt of at least one metal selected from zinc, aluminum and copper. The defect with this method is that the water resistance of the lake pigment obtained is not satisfactory since calcium metal, etc., bonding to the rosin is hardly replaced with the metal of the salt added during or after the coupling.

SUMMARY OF THE INVENTION

It is an object of this invention to provide a process for the production of a monoazo lake which is coated with a water-insoluble rosin and improved in lipophilic nature and water resistance, and a process for the production of a dispersion comprising the monoazo lake and a vehicle.

It is another object of this invention to provide a process for the production of a monoazo lake which is coated with a water-insoluble rosin and capable of giving excellent printability without impairing transparency, clearness and dispersibility, and a process for the production of a dispersion comprising the monoazo lake and a vehicle.

According to this invention, there is provided a process for the production of a monoazo lake coated with a water-insoluble metal salt of rosin, which comprises the steps of:

(a) adjusting a mixed solution containing a monoazo dye having a water-soluble group and an alkali metal or ammonium salt of rosin to pH of 8 to 12, and adding an stoichiometeric amount of a metal salt of at least one metal for insolubilizing rosin selected from the group consisting of zinc, aluminum, copper and manganese to form a water-insoluble rosin metal salt, and (b) adjusting the resultant mixture containing the water-insoluble rosin metal salt to pH of 9 to 12, and adding a metal salt of at least one metal for forming a lake of a monoazo dye selected from the group consisting of calcium, barium and strontium to form a monoazo lake.

According to this invention, there is also provided a process for the production of a monoazo lake dispersion, which comprises dispersing the above-obtained monoazo lake in a vehicle.

DETAILED DESCRIPTION OF THE INVENTION

A monoazo lake is obtained by forming a lake of a dye which is prepared by coupling a diazotized aromatic amine as a diazo component with a coupler component.

The monoazo lake obtained by the process of this invention contains at least one metal selected from calcium, barium and strontium as a metal for formation of a lake of a monoazo dye and at least one metal selected from zinc, aluminum, copper and manganese as a metal for water-insolubilization of a rosin, and the monoazo lake is coated with a water-insoluble rosin metal salt.

The diazo component is that which is obtained by converting an aromatic amine having a soluble group into a diazo form. Examples of such an aromatic amine are 1-amino-4-methylbenzene-2-sulfonic acid (p-toluidine-m-sulfonic acid), 1-amino-4-methyl-5-chlorobenzene-2-sulfonic acid, 1-amino-4-chloro-5-methylbenzene-2-sulfonic acid, 1-amino-4-methylbenzene-3-sulfonic acid, and 1-amino-3-methyl-4-sulfonic acid.

A typical example of the coupler component is $\beta$-naphthoic acid, and $\beta$-naphthol and acetoacetanilide may be used. Further, derivatives of these coupler components, e.g., those substituted with a lower alkyl group, an alkoxy group or a halogen atom may be also used.

The monoazo dye used in this invention can be produced according to a known process for the production of a conventional monoazo dye. That is, a diazo component is formed by converting an aromatic amine having a soluble group into a diazo form according to a conventional method. A coupler component is added to the diazo component and coupled with it according to a conventional method.

A rosin, which is considered to have an effect as a dispersant and a crystal growth inhibitor, is incorporated into the coupler component or the dye in advance, and the amount of the rosin is preferably 2 to 50% by weight, more preferably 10 to 25% by weight, based on the monoazo dye.

This invention has a feature in that the metal for lake formation and the metal for insolubilization of the rosin are different from each other.

In this invention, the monoazo lake coated with a water-insoluble rosin metal salt can be produced by the following method.

A mixed solution containing a monoazo dye and a water-soluble salt of rosin, i.e., an alkali metal or ammonium salt of rosin is adjusted to pH of 8 to 12, preferably pH of 8.5 to 11.5. Then, a salt, e.g., hydrochloride, nitrate, sulfate, or the like, of at least one metal selected from zinc, aluminum, copper and manganese is added to the solution, whereby a slurry is formed. In the slurry, a metal salt for insolubilizing rosin is formed, and with an advance in the formation of this metal salt, the pH of the slurry becomes smaller than 8. The slurry is then adjusted to pH of 9 to 12, and a metal salt of a metal for forming a lake of a monoazo dye such as a metal salt of calcium, barium or strontium is added to the slurry. As a result, there is formed a monoazo lake pigment coated with a water-insoluble rosin metal salt. Preferably, the resultant pigment slurry is adjusted to pH of 7.5 to 11 and dried. When the pigment slurry has pH of less than 7.5 or more than 11, the zinc, aluminum, copper or manganese salt of rosin is liable to be separated to form a water-soluble salt and a metal.

The treatment of a lake with rosin is carried out for the following two reasons.

First, particles of a pigment are finely controlled by carrying out a lake formation reaction in the presence of rosin, thereby to prevent the crystal growth. As a result, there is obtained a pigment having improved transparency and clearness.

Secondly, aggregation of particles of a pigment is prevented when the pigment is dried. As a result, there is obtained an easily dispersible pigment having a soft texture.

The monoazo lake dispersion provided by the process of this invention comprises the above monoazo lake coated with a water-insoluble rosin metal salt and a vehicle for dispersion of a resin. The vehicle is selected depending upon a product.

The vehicle for printing inks is as follows. The vehicle for an offset ink comprises 20 to 50 parts by weight of a rosin-modified phenolic resin, petroleum resin, alkyd resin or drying oil-modified resin of these, 0 to 30 parts by a plant oil such as linseed oil, tung oil or soybean oil, and 10 to 60 parts by weight of a solvent such as n-paraffin, isoparaffin, an aromatic hydrocarbon, naphthene or α-olefin. An offset printing ink composition is prepared by incorporating a monoazo lake of this invention into the vehicle for an offset ink and suitably adding known additives such as other ink solvent, a dryer, leveling improver, thickener, and the like.

The vehicle for a gravure ink comprises 10 to 50 parts by weight of a gum rosin, wood rosin, tall oil rosin, calcified rosin, lime rosin, rosin ester, maleic resin, gilsonite, dammar, shellac, polyamide resin, vinyl resin, nitrocellulose, cyclorubber, ethyl cellulose, cellulose acetate, ethylene-vinyl acetate copolymer resin, urethane resin, polyester resin or alkyd resin, 30 to 80 parts by weight a solvent such as of n-hexane, toluene, ethanol, methanol, acetone, ethyl acetate, ethyl lactate, cellosolve, diacetone alcohol, chlorobenzene, ethyl ether, acetal ethyl ether, ethyl acetoacetate, or butyl acetate cellosolve, 3 to 35 parts by weight of the monoazo lake of this invention, 0 to 20 parts by weight of an extending pigment such as barium sulfate, barium carbonate, calcium carbonate, gypsum, alumina white, clay, silica, silica white, talc, calcium silicate or precipitating magnesium carbonate, and other auxiliaries such as a plasticizer, ultraviolet inhibitor, antioxidant, antistatic agent, and the like.

In this invention, the coating composition comprises 0.1 to 15% by weight of the monoazo lake of this invention, 99.9 to 55% by weight of a vehicle for a coating composition, and 0 to 30% by weight of other auxiliary and/or an extending pigment. The vehicle for the coating composition comprises 80 to 20% by weight of an acrylic resin, alkyd resin, epoxy resin, chlorinated rubber, vinyl chloride, synthetic resin emulsion, silicone resin, water-soluble resin, polyurethane, polyester, urea resin or a mixture of these, and 60 to 10% by weight of a hydrocarbon, alcohol, ketone, ether alcohol, ether, ester or water.

This invention will be explained hereinbelow by reference to Examples, in which "part" stands for "part by weight" and "%", for "% by weight".

EXAMPLE 1 AND COMPARATIVE EXAMPLE 1

A diazo component was prepared as follows. 90.6 Parts of 1-amino-4-methylbenzene-2-sulfonic acid, 2.9 parts of 1-amino-4-methylbenzene-3-sulfonic acid and 1.8 parts of 2-aminonaphthalene-1-sulfonic acid were dissolved in a solution consisting of 1,500 parts of water and 20 parts of sodium hydroxide.

124 Parts of 35% hydrochloric acid was added to the resultant mixture to carry out acid precipitation. Then, 1,000 parts of ice was added, and the mixture was cooled to 0° C. A solution of 35 parts of sodium nitrite in 100 parts of water was added, and the mixture was stirred at not more than 3° C. for 30 minutes.

Separately, a coupler component was prepared as follows. 95 Parts of β-hydroxynaphthoic acid was dissolved in a solution consisting of 3,000 parts of water and 51 parts of sodium hydroxide, and the resultant mixture was cooled to 15° C. The diazo component was added dropwise to the coupler component over 20 minutes to carry out a coupling reaction. The reaction mixture was stirred for 30 minutes, and then, 509 parts of 10% rosined soap (24% as a resin solid content based on dyestuff) was added. The mixture was adjusted to pH of 11.5 by adding a 1% sodium hydroxide aqueous solution.

A solution of 25 parts of zinc nitrate in 200 parts of water was added to the above mixture to precipitate rosin zinc. The pH of the mixture decreased to 8.5. The mixture was adjusted to pH of 11.0 with a 1% sodium hydroxide solution. Then, 300 parts of a 35% calcium chloride aqueous solution was added, and the resultant mixture was stirred for 3 hours to complete the lake-forming reaction of the dye. At this stage, the mixture (slurry) had pH of 10.0. The slurry was heated up to 60° C. and filtered, and the resultant solid was purified, dried and milled to give 264 parts of a monoazo lake pigment.

In Comparative Example, a pigment was obtained in the same manner as in Example 1 except that 300 parts of a 35% calcium chloride aqueous solution was added without adding zinc nitrate to the dye/rosin soap mixture of which the pH had been adjusted to 11.0.

The pigment obtained in Example 1 and the pigment obtained according to a conventional process in Comparative Example 1 were measured for a contact angle. The pigment obtained in Comparative Example 1 had a contact angle, to water, of 40°, and the pigment obtained in Example 1 had a contact angle, to water, of 46°. Further, the pigment obtained in Comparative Example 1 had a contact angle, to methylene iodide, of 25°, and the pigment obtained in Example 1 had a contact angle, to methylene iodide, of 21°. Thus, the pigment obtained in Example 1 had higher hydrophobic nature and higher lipophilic nature than pigment obtained in Comparative Example 1.

The pigment obtained in Comparative Example 1 was measured for a heat of wetting to water with a calorimeter to show 5.3 cal/g, and the pigment obtained in Example 1 was measured in the same manner to show 3.8 cal/g.

Extraction water used for the extraction of the pigments obtained in Example 1 and Comparative Example 1 were measured for specific electric conductivity as follows. 5 Grams out of a pigment sample was suspended in 200 cc of distilled water, and the suspension was stirred at 85° C. for 1 hour and cooled to room temperature. Solids were filtered off by using a No. 6c filter paper, and the filtrate was measured for a specific electric conductivity. As a result, the pigment obtained in Comparative Example had a specific electric conductivity of 130 μs/cm and the pigment obtained in Example 1 had a specific electric conductivity of 37 μs/cm.

The pigment obtained in Comparative Example had a surface tension of 61.3 dyn/cm, and the pigment obtained in Example 1 had a surface tension of 68.1 dyn/cm. Thus, the amount of an eluate from the pigment obtained in Example 1 into water was smaller than that from the pigment obtained in Comparative Example 1.

An offset ink containing the pigment obtained in Example 1 and an offset ink containing the pigment obtained in Comparative Example 1 were tested. That is, a varnish was prepared by adding 20 parts of linseed oil and 30 parts of No. 5 solvent (ink solvent, supplied by Nippon Oil Co., Ltd.) to 50 parts of Tamanol 361 (rosin-modified phenolic resin, supplied by Arakawa Chemical Co., Ltd.), and heating the mixture at 200° C. 2 Parts of aluminum octylate was added to 98 parts of the varnish to prepare a gelled varnish.

70 Parts of the gelled varnish, 20 parts of the pigment and 10 parts of a No. 1 solvent (ink solvent, supplied by Nippon Oil Co., Ltd.) were mixed together, and kneaded with a three-roll mill to give an offset ink having a tack value of 9.0.

The offset ink containing the pigment obtained in Example 1 had excellent dispersibility over the offset ink containing the pigment obtained in Comparative Example 1. That is, coarse particles the pigment obtained in Comparative Example 1 disappeared in three passes, whereas those of the pigment obtained in Example 1 disappeared in two passes. These two offset inks visually showed nearly the same transparency, clearness and coloring power. However, the offset ink containing the pigment obtained in Example 1 exhibited a smaller change in emulsification, i.e., in fluidity when water was forcibly emulsified in the ink, than the offset ink containing the pigment obtained in Comparative Example 1. And, the offset ink containing the pigment obtained in Example 1 had a higher apparent surface tension, and an extraction water which was obtained by emulsifying 1 part of the ink in 2 parts of distilled water and filtering and which contained a water-soluble portion of the ink had a high surface tension. Table 1 shows the results.

TABLE 1

|  | Comparative Example 1 | Example 1 |
|---|---|---|
| Change in Emulsification |  |  |
| radius value *1) | +0.31 | +0.19 |
| slope *1) | −0.22 | +0.11 |
| Apparent surface tension (dyn/cm) | 50.2 | 54.5 |
| Surface tension of emulsification water (dyn/cm) | 57.0 | 66.4 |

*1) Measurement by a spread meter.

EXAMPLES 2-4

Example 1 was repeated except that 25 parts of the zinc nitrate was replaced with 7.6 parts of manganese chloride (Example 2), 7.2 parts of cupric chloride (Example 3) or 20.5 parts of aluminum sulfate (Example 4), whereby 236 parts, 237 parts or 232 parts of a monoazo lake pigment was obtained. Table 2 shows the physical properties of the pigments obtained in Examples 2 to 4 and the pigment obtained in Comparative Example 1.

TABLE 2

|  | Heat of wetting (cal.g) | Specific electric conductivity of extraction water (μs/cm) | Surface tension extraction water (dyne/cm) |
|---|---|---|---|
| Example 2 | 3.6 | 45 | 68.3 |
| Example 3 | 3.8 | 48 | 67.4 |
| Example 4 | 3.6 | 40 | 68.1 |
| Comparative Example 1 | 4.8 | 137 | 60.5 |

EXAMPLE 5 AND COMPARATIVE EXAMPLE 2

125 Parts of sodium 1-amino-4-methyl-3-chloro-2-sulfonate was dissolved in 1,500 parts of water. 112 Parts of 35% hydrochloric acid was added to carry out acid precipitation, and the resultant mixture was allowed to cool to room temperature. Then, a solution of 35 parts of sodium sulfite in 100 parts of water was added, and the mixture was stirred at a temperature of not more than 3° C. to obtain a diazo component.

Separately, 95 parts of β-hydroxynaphtoic acid was dissolved according to a conventional method.

The diazo component was added dropwise to the coupler component over 20 minutes to carry out a coupling reaction. The coupling reaction product was stirred for 30 minutes, and 212 parts (10% based on dyestuff content) of a rosined soap was added. The resultant mixture was adjusted to pH of 8.5 with a 1% sodium hydroxide aqueous solution and a 1% hydrochloric acid aqueous solution. Then, a solution of 5.8 parts of aluminum chloride in 200 parts of water was added to precipitate a rosin aluminum salt. In this case, the pH of the mixture decreased to 6.5. The mixture was adjusted to pH of 9.0 with a 1% sodium hydroxide aqueous solution.

Then, the mixture was heated up to 80° C., and 125 parts of barium chloride was gradually added to complete the coupling reaction. At this stage, the mixture (slurry) had pH of 8.0. This slurry was filtered, and the remainder was washed with water and dried to give 238 parts of a monoazo lake pigment.

In Comparative Example 2, a pigment was prepared in the same manner as in Example 5 except that the dye/rosin soap mixture of which the pH had been adjusted to 9.0 was heated up to 80° C. without adding aluminum chloride and that 125 parts of barium chloride was gradually added.

The pigment obtained in Example 5 and the pigment obtained in Comparative Example 2 were measured for physical property values in the same manner as in Example 1.

The measurement values on the contact angle and heat of wetting showed that the pigment obtained in Example 5 had higher hydrophobic and lipophilic nature than the pigment obtained in Comparative Example 2. Further, the extraction water used for the extraction of the pigment obtained in Example 5 had a lower specific electric conductivity and a higher surface tension than that used for the extraction of the pigment obtained in Comparative Example 2.

Then, a gravure ink containing the pigment obtained in Example 5 and a gravure ink containing the pigment obtained in Comparative Example 2 were tested to show that the gravure ink containing the pigment obtained in Example 5 had excellent transparency, clearness and tinting strength over the gravure ink containing the pigment obtained in Comparative Example 2. The test was carried out as follows.

| Pigment | 15 parts |
| --- | --- |
| Nitrocellulose-containing varnish | 90 parts |
| Solvent | 17 parts |
| glass beads having a diameter of 3 mm | 100 parts |

The above components were charged into a 220 cc glass bottle, and shaken with a paint conditioner for 2 hours to give a high-density ink.

The ink containing the pigment obtained in Example 5 had a higher 60° gloss by 7% than the ink containing the pigment obtained in Comparative Example 2.

Further, a light-color ink was prepared by incorporating 10 parts of a white ink into 1 part of the high-density ink, and tested on coloring strength. The light-color ink from the high-density ink containing the pigment obtained in Example 5 showed higher tinting strength by about 5% than the light-color ink from the high-density ink containing the pigment obtained in Comparative Example 2.

| Pigment | 8 parts |
| --- | --- |
| Alkyd resin varnish | 50 parts |
| Melamine resin varnish | 30 parts |
| Thinner | 12 parts |
| Steel beads having a diameter of 2 mm | 300 parts |

A composition of the above components was shaken for 90 minutes with a paint conditioner to obtain an oil coating composition. The coating composition containing the pigment obtained in Example 5 was excellent in tinting strength and gloss over the coating composition containing the pigment obtained in Comparative Example 2.

What is claimed is:

1. A process for the production of a monoazo lake coated with a water-insoluble metal salt of rosin, which comprises the steps of:

(a) adjusting a mixed solution containing a monoazo dye having a water-soluble group and an alkali metal or ammonium salt of rosin to pH of 8 to 12, and adding an stoichiometric amount of a metal salt of at least one metal for insolubilizing rosin selected from the group consisting of zinc, aluminum, copper and manganese to form a water-insoluble rosin metal salt, and (b) adjusting the resultant mixture containing the water-insoluble rosin metal salt to pH of 9 to 12, and adding a metal salt of at least one metal for forming a lake of a monoazo dye selected from the group consisting of calcium, barium and strontium to form a monoazo lake.

2. A process according to claim 1, wherein the rosin is used in such an amount that it is 2 to 50% by weight based on the monoazo dye.

3. A process according to claim 1, wherein the monoazo dye has a sulfonic acid group.

4. A process for the production of a monoazo lake dispersion, which comprises dispersing a monoazo lake obtained by a process recited in claim 1 in a vehicle.

5. A process for the production of a monoazo lake dispersion, which comprises dispersing a monoazo lake obtained by a process recited in claim 2 in a vehicle.

6. A process for the production of a monoazo lake dispersion, which comprises dispersing a monoazo lake obtained by a process recited in claim 5 in a vehicle.

* * * * *